Feb. 21, 1956     E. W. EVANS     2,735,271
DEHYDRATION OF LIQUEFIED PETROLEUM GAS
Filed Sept. 30, 1954
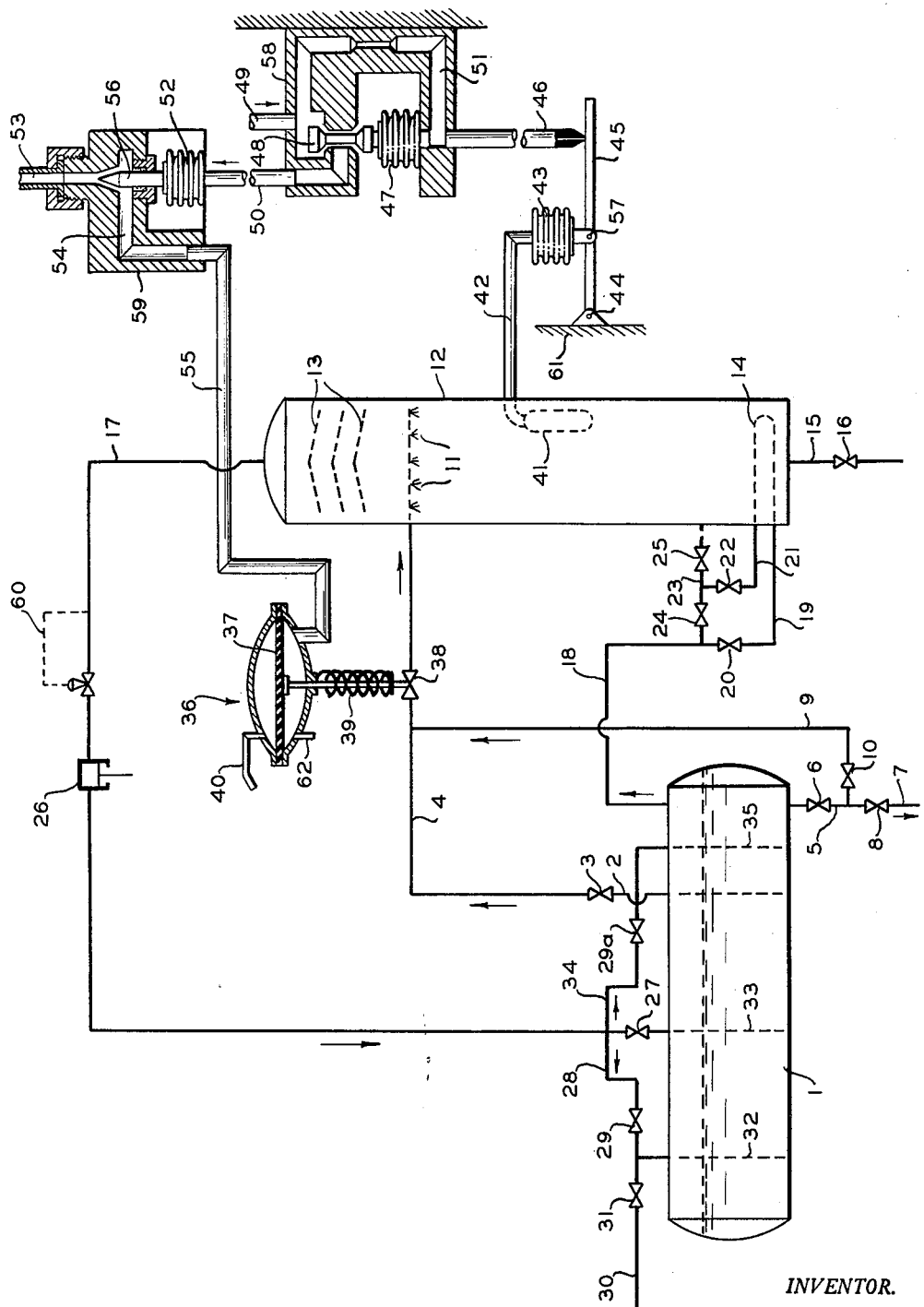
*INVENTOR.*
E. W. EVANS
BY *Hudson + Young*
ATTORNEYS United States Patent Office 2,735,271
Patented Feb. 21, 1956

2,735,271

DEHYDRATION OF LIQUEFIED PETROLEUM GAS

Edmond W. Evans, Bartlesville, Okla., assignor to Phillips Petroleum Company, a corporation of Delaware Application September 30, 1954, Serial No. 459,317

9 Claims. (Cl. 62—1)

This invention relates to the dehydration of hydrocarbon liquids. In one aspect it relates to a method and apparatus for dehydrating liquefied petroleum gases. In another aspect it relates to a method and apparatus for the reduction of the moisture content of liquefied petroleum gases to such an extent that ice does not freeze in pressure reduction valves used in the reduction of pressure from storage pressure to distribution system pressures.

My invention is especially suited for use in pipe line distribution terminals which handle liquefied petroleum gases. Although every effort is made by the manufacturer of liquefied petroleum gases to produce and to ship, either by tank car or by pipe line, a dry product, occasionally LPG (liquefied petroleum gas) products become contaminated with water. The presence of water, either as dissolved moisture or as a separate liquid phase does not present a serious problem in LPG production plants because conventional drying facilities are ordinarily available at such plants. The problem does become serious, however, in LPG distribution terminals because drying facilities are usually not available.

To be suitable for sale as household fuel LPG (a shortened term for liquefied petroleum gas) should have a dew-point below about −20° F. The term dew-point usually refers to the temperature at which moisture condenses from air. In this specification and claims the term dew-point is intended to be the temperature at which moisture condenses from a vapor phase comprising moisture and one or more normally gaseous hydrocarbons. Thus, a dew-point of for example −20° F. means that moisture condenses from a vapor phase containing water vapor and for example gaseous propane or LPG vapors at a temperature of −20° F.

The condensation of moisture as liquid water does not ordinarily cause serious operating difficulties but when liquefied petroleum gas is passing through a pressure reduction valve and the temperature of the valve decreases to a temperature below 32° F. moisture condenses as ice. A valve can then become frozen open, which condition can permit high tank pressures to enter low pressure distribution systems or the valve can be frozen shut which condition would result in a stoppage of gas flow to low pressure distribution systems. Liquefied petroleum gases are usually stored in tanks under pressures varying from about 30 to about 200 p. s. i. g. (pressure per square inch gauge) depending upon the composition of the LPG. If the LPG is commercial propane, storage pressures can be as high as 200 p. s. i. g. because the vapor pressure of propane at 100° F. is about 190 p. s. i. g. Thus, when such an LPG as propane is vaporized and its pressure reduced by passing through a pressure reduction valve to a distribution system pressure of for example 10–11 inches of water considerable cooling results. Upon prolonged vaporization and pressure reduction of propane, if much moisture is present in the propane the pressure reduction valve is apt to freeze open or shut or become otherwise inoperative. Such a condition, obviously, is to be avoided.

An object of my invention is to provide a process for dehydrating liquefied normally gaseous hydrocarbons.

Another object of my invention is to provide a process for dehydrating liquefied petroleum gases which process is simple and inexpensive to operate.

Another object of my invention is to provide a method for dehydrating a moisture containing liquefied petroleum gas containing a stench without removing the stench from the liquefied gas.

Yet another object of my invention is to provide an LPG dehydration method involving as nearly as possible the use of apparatus ordinarily present at LPG distribution terminals.

Still other objects and advantages of my invention will be realized upon reading the following description which, taken with the attached drawing, forms a part of this specification.

I accomplish these and other objects and advantages by providing a method for dehydrating liquefied petroleum gas containing dissolved moisture and stored in a tank under superatmospheric pressure comprising withdrawing vapor from said storage tank, introducing the withdrawn vapor into a treating zone maintained under a pressure below said superatmospheric pressure, withdrawing liquefied gas from said storage tank, introducing the withdrawn liquid into said treating zone whereby said liquefied gas vaporizes and cools the vapor contents of the treating zone to a temperature below the dew-point of the vapor in the treating zone, from said treating zone withdrawing cooled vapor having a lower moisture content than the moisture content of the vapor introduced into said treating zone, compressing this withdrawn lower moisture content vapor and introducing the compressed vapor into the liquid phase in the storage tank.

In the drawing, the figure illustrates in diagrammatic form one arrangement of apparatus parts for carrying out the process of my invention.

In the drawing reference numeral 1 identifies a tank suitable for storing a liquefied petroleum gas under pressure. Vessel 12 is termed herein a treating vessel or treating zone in which the actual dehydration step of my process takes place. This vessel can be most any type of vessel suitable for operating under at least a few pounds of pressure and has several pipe connections as hereinafter described. A pipe 2 leads from a point very close to the bottom of tank 1 to a valve 3 which in turn is connected with a pipe 4, while a pipe 5 containing a valve 6 is connected with the bottom of the tank. To pipe 5 is connected a pipe 7 provided with a valve 8, as shown. To pipe 5 is also connected a pipe 9 containing a valve 10 and this pipe 9 is connected with pipe 4 and pipe 4 leads on to the treating tank 12. A flow control valve assembly 36 is provided in pipe 4 for regulating the rate of flow of liquefied gas from tank 1 to treating vessel 12. Spray nozzles 11 are provided in tank 12 to distribute and to spray liquid in the treating tank. The valve mechanism 38 as a part of the valve assembly 36 is a normally closed throttle type valve.

A pipe 18 leads from the top of tank 1 and from the end of pipe 18 a pipe 23 containing valves 24 and 25 and a pipe 19 containing a valve 20 are connected. Pipe 19 is connected with a heat exchanger coil 14 in the lower portion of tank 12. A pipe 21 is connected with the other end of the heat exchanger 14 and with pipe 23 at a point between valves 24 and 25. Pipe 21 is provided with a valve 22.

A pipe 15, provided with a valve 16, is connected with the bottom of the tank 12 while a pipe 17, provided with a back pressure regulator 60, connects the top of tank 12 with a valve 27 which in turn is connected with a pipe 33 leading to the bottom of tank 1. A pipe 28 connects pipe 17 with a pipe 32 in tank 1 while another pipe 34 also connects pipe 17 with a pipe 35 in tank 1. Pipes 28 and 34 are provided with valves 29 and 29a, respectively. To pipe 29 is also connected another pipe 30 provided with a valve 31. A compressor 26 is arranged in pipe 17 between the back pressure regulator 60 and the point at which branch lines 28 and 34 are connected. Some baffle plates 13 are provided in a top portion of treating tank 12 as shown.

The control portion of my apparatus comprises a bulb 41 containing a thermally expansive fluid, such as ethane, propane or alcohol. This bulb is attached by way of a tube 42 to a bellows 43. Bellows 43 is attached by a pivot 57 to a baffle 45. Baffle 45 is attached to a rigid support 61 by a pivot 44. A bleed nozzle 46 is positioned very near baffle 45, as shown, and is connected fluid-tight by way of a relay body member 58 to a bellows 47. To the top of bellows 47 is attached a 2-way valve 48 as shown. A tube 49 leads from a source of air under pressure, not shown, to a conduit 51 in body member 58. Conduit 51 is also in fluid communication with bellows 47. The valve 48 regulates the flow of air from the upper portion of conduit 51 entering a tube 50. It also regulates flow of air from bellows 52 and tube 50 to the atmosphere. To the top of bellows 52 is attached an element 56 which serves as a valve in a needle valve assembly. This needle or needle valve 56 is intended to regulate the flow of air from a conduit 53 to a conduit 54. A tube 55 is intended to conduct air from conduit 54 in block 59 to the lower side of a diaphragm 37 of the diaphragm operated motor valve assembly 36. This diaphragm 37 is a flexible diaphragm such as is commonly used in diaphragm motors for operating valves. A tube 40 serves as a vent tube to maintain atmospheric pressure on the upper side of diaphragm 37. A bleed element 62 is provided in a lower housing of this diaphragm assembly and is conventional in such pneumatically operated motors. A compression spring 39 is employed in operative relation to the valve 38 in such a manner that the valve 38 is a normally closed valve requiring an increase of air pressure against the under surface of diaphragm 37 to open the valve.

In the operation of the above described apparatus parts vaporous propane containing moisture is passed from the vapor space of tank 1 through pipe 18 and pipe 23, with valves 24 and 25 being open and valves 20 and 22 being closed, into the lower portion of treating tank 12. Because of the very slight solubility of water in liquid hydrocarbons, such as propane, vaporous propane in equilibrium with liquid propane contains a greater concentration of moisture than does the liquid. On passing through valve 24 and/or valve 25 the pressure of the propane is reduced from its storage pressure to about 10 p. s. i. g. The back pressure regulator 60 is so adjusted as to maintain the pressure in the treating tank 12 of about 10 pounds gauge. Liquid propane is removed from the storage tank through pipe 2 and valve 3 or through pipe 5 and 9 with valves 6 and 10 being open and is passed through pipe 4 containing the throttle valve 38 into the treating tank 12 by way of spray nozzles 11. On passing through the throttle valve 38 pressure on the liquid propane is reduced from the storage pressure of tank 1 to the treating tank pressure which as mentioned above is about 10 pounds per square inch gauge. At this greatly reduced pressure the liquid propane on emerging from spray nozzles 11 vaporizes with the subsequent cooling of the vapor contents of tank 12 to about −20° F. In operation it is desired to chill the vaporous propane to a temperature a few degrees below the desired dew-point of the finished product. If the desired dew-point is below 32° F. moisture will condense from the vaporous propane as a solid or snow while if the temperature maintained within the treating tank 12 is above 32° F. the moisture will condense as liquid and will fall to the bottom of the tank as rain. The baffles 13 are intended to assist in separating the precipitated moisture from the vaporous propane as the propane leaves the treating tank by way of pipe 17. The propane is transferred from tank 12 by compressor 26 to the storage tank. The compression of the propane from the 10 pounds treating tank pressure to the storage tank pressure heats the propane and it is this heated or warmed propane which actually enters tank 1 by way of pipes 32, 33 and 35. If the propane storage tank is a relatively small tank a single vaporous propane inlet pipe such as pipe 33 is ordinarily all that is required but if the tank is a large horizontally disposed tank, as illustrated in the drawing several inlet pipes are preferred. The vaporous propane returned to storage tank 1 is intended to stir the propane liquid in the tank so that liquid propane containing moisture in solution will always be present at the interface between the liquid propane and the vaporous propane so that the moisture can be transferred from the liquid to the vapor for efficient removal of the moisture.

The water content of liquid propane and of vaporous propane in equilibrium with each other at 60° F. is 0.0110 and 0.1334 weight per cent, respectively. From these values it is seen that the water content of vaporous propane in equilibrium with liquid propane at 60° F. is about 12 times as much as that in the liquid phase. For efficient operation of my process the pounds of vaporous propane fed to the dehydrator vessel 12 are considerably more than the pounds of liquid propane fed to the dehydrator. The only need for feeding liquid propane to the dehydrator is to furnish the required refrigeration for condensing out moisture from the vapors. To produce a dehydrated propane having a dew-point of about −20° F. 1 pound of liquid propane per 7 pounds of vaporous propane fed to tank 12 provides the required refrigeration.

If for some reason, the amount of refrigeration admitted to tank 12 is not sufficient to obtain the required vapor temperature in this tank and the temperature of the vapor contents of the tank increases the temperature of bulb 41 also increases. This increase in bulb temperature is transmitted as pressure through tube 42 to bellows 43. Upon increase of pressure in bellows 43 the bellows extends and lowers baffle 45 around its pivot point 44 which movement permits bleeding of a greater quantity of air from bleed orifice 46. Increase of air flow through bleed orifice 46 causes bellows 47 to contract which movement permits air pressure in bellows 52 to decrease with the simultaneous downward movement of needle valve 56. When needle valve 56 moves downward operating air from pipe 53 flows more freely around valve 56 and through conduit 54 and tube 55 to the underside of diaphragm 37 with the result that the diaphragm is moved upward with the simultaneous opening of the throttle valve 38. This opening of throttle valve 38 permits more liquid propane to flow from pipe 4 to spray nozzles 11 with the result that the contents of the tank are reduced in temperature.

If for some reason too much liquid propane is sprayed into tank 12 and the vapor contents are cooled too much, the temperature of bulb 41 is thus too low and fluid in bulb 41 contracts with the result that bellows 43 contracts and raises baffle 45 into closer proximity of bleed orifice 46. This movement results in restricting the air flow through orifice 46 and bellows 47 expands and raises valve 48 to permit a greater flow of air from tube 49 into tube 50 and bellows 52. Bellows 52 then expands, and moves needle 56 upward and air flow from tube 53 to conduit 55 is restricted with the result that the bleeding of air through bleed nozzle 62 decreases the air pressure on the underside of diaphragm 37 sufficiently that the compression spring 39 tends to close or at least throttle the flow of propane through valve 38. This operation results in addition of less refrigeration to the treating tank and the temperature within the treating tank 12 raises. All of this apparatus is operated in a manner understood by those skilled in the art to maintain any given desired temperature within the treating tank 12.

Under temperature conditions maintained in the treating tank 12 it is possible that some hydrocarbon-hydrates may form. If solid hydrocarbon-hydrates form they will drop to the bottom of the tank. In order to remove water from the treating tank 12 in case the water is in its liquid form it is merely necessary to open valve 16 in pipe 15 and drain out the water. Water in the form of ice, snow or a solid hydrocarbon-hydrate, can be easily removed by melting the solids and then removing the melt via pipe 15. To melt these solids I pass warm vaporous propane from tank 1 through coil 14 prior to its introduction into the treater. If the storage tank temperature is for example 60° F. the vaporous propane at this temperature passes through pipe 18 and pipe 19 with valve 24 being closed and valves 20, 22 and 25 being open through the heat exchanger 14. From pipe 21 the vaporous propane then passes through pipe 23 and through the pressure reducing valve 25 for admission to the treater. In this manner the ice, snow or hydrocarbon-hydrates are melted for easy removal through pipe 15. Because the amount of moisture to be separated from liquefied petroleum gas is relatively small the amount of hydrocarbon combined with water in the form of hydrates in tank 12 is relatively small and these hydrates can be removed with only a very small loss of hydrocarbon. Hydrocarbon-hydrates appear to be stable in the liquid form as well as in the solid form and the hydrocarbon is not released upon melting or upon dissolving in liquid water.

One particular advantage in the use of my method and apparatus for dehydrating LPG is that about the only apparatus not ordinarily available at LPG distribution terminals is the treater tank, such as tank 12. The other relatively expensive piece of equipment required is a compressor for compressing the vaporous propane for its return to the storage tank. Distribution terminals ordinarily have such a compressor in their piping system for the normal handling of such materials. Another advantage of my invention is that the use of my system for removing moisture does not remove the stench, such as ethyl mercaptan, added to the LPG for detection of leakage in pipe joints and in appliances. One disadvantage in the use of such dehydrating agents as bauxite or silica gel and the like, or such as ethylene glycol, etc., is that these agents remove the stench from the LPG and either more stench has to be added or the liquefied gas does not meet trade specifications.

By constructing the apparatus for carrying out my process as illustrated in the drawing the process is substantially automatic. While I have described a pneumatic control system for regulating the flow of liquid into the treater tank 12 the use of such equipment was given merely as an example of one method of controlling the operation. Another type of apparatus, such as electrically operated apparatus, has for example a thermocouple disposed within treating tank 12 in place on the bulk 41. The thermocouple regulates voltage controllers, etc. and/or to operate a valve corresponding to valve 38.

Pipe 7, with valve 8, is provided so that liquid water, if present in the bottom of the storage tank 1, can be easily removed. In this manner the removal of liquid water from the storage tank is not carried out in the treating tank 12. In such LPG storage apparatus there is not ordinarily any water, or at most a very, very small amount of water as a separate water phase because manufacturers and producers of such materials make every effort possible to produce a dry product.

While the above flow diaphragm has been described for illustrative purposes, the invention obviously is not limited thereto.

I claim:

1. A method for dehydrating a liquefield petroleum gas containing moisture and stored in a tank under superatmospheric pressure comprising withdrawing vapor from said storage tank, introducing the withdrawn vapor into a treating zone maintained under a pressure below said superatmospheric pressure, withdrawing liquefied gas from said storage tank, introducing the withdrawn liquid into said treating zone whereby the introduced liquefied gas vaporizes and cools the vapor contents of the treating zone by direct heat exchange to a temperature below the dew point of the vapor in the treating zone, from said treating zone withdrawing cooled vapor having a lower moisture content than the moisture content of the vapor introduced into said treating zone, compressing this withdrawn lower moisture content vapor and introducing the compressed vapor into the liquid phase in the storage tank.

2. A method for dehydrating a liquefied petroleum gas containing dissolved moisture and stored in a tank under superatmospheric pressure comprising withdrawing vapor from said storage tank, introducing the withdrawn vapor into a treating zone maintained at a pressure lower than said superatmospheric pressure, withdrawing liquefied gas from said storage tank, introducing the withdrawn liquid into said treating zone at said lower pressure whereby the introduced liquid vaporizes and cools the vapor previously introduced into the treating zone by direct heat exchange to a temperature below the dew point of the vapor in the treating zone, withdrawing cooled vapor having a lowered moisture content from said treating zone, compressing this withdrawn lowered moisture content vapor, introducing the compressed vapor into the liquid phase of said storage tank and withdrawing liquid water from said treating zone.

3. The method of claim 1 wherein the liquefied petroleum gas is propane and a pressure of about 10 pounds per square inch gauge is maintained in the treating zone.

4. The method of claim 1 wherein the liquefied petroleum gas is propane and the volume of liquid propane introduced into said treating zone and vaporized therein is so regulated as to cool the vapor contents of said treating zone to a temperature of about −20° F. thereby producing a propane product having a dew point of about −20° F.

5. The method of claim 4 wherein the rate of introduction of liquid propane into said treating zone is so regulated as to give a ratio of about one pound of liquid propane to seven pounds of propane vapor introduced into said zone.

6. In the method of claim 5 heating the lower portion of said treating zone so as to melt solidified water separated from the vapor in said zone.

7. In the method of claim 4, passing the vapor, withdrawn from said storage tank, in heat exchange with the separated moisture in the bottom of said treating zone prior to its introduction into said treating zone.

8. A liquefied petroleum gas dehydrating system comprising, in combination, a vessel adapted to store liquefied petroleum gas under superatmospheric pressure, a treating vessel, a first conduit communicating from the upper and normally vapor space of said storage vessel to the lower portion of said treating vessel, a pressure reducing means in said first conduit, a second conduit leading from the normally liquid containing space of said storage vessel to said treating vessel at a point nearer the top than the bottom thereof, a flow control valve in said second conduit, a third conduit leading from the portion of said treating vessel above the point of communication of said second conduit with the treating vessel to the normally liquid containing space of said storage vessel, a compressor disposed operatively in said third conduit, a temperature responsive means in communication with the interior of said treating vessel and means to operate said flow control valve in response to temperature of said temperature-responsive means within said treating vessel.

9. In the system of claim 8 wherein said means to operate said flow control valve is adapted to open said flow control valve in response to a decrease in temperature of said temperature responsive means.

References Cited in the file of this patent

UNITED STATES PATENTS

| | | |
|---|---|---|
| 2,262,744 | Walker | Nov. 11, 1941 |
| 2,400,620 | Zwickl | May 21, 1946 |
| 2,449,688 | Brinkoeter | Sept. 21, 1948 |
| 2,450,707 | Zwickl | Oct. 5, 1948 |